UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

PRODUCTION OF CYANID AND CYANAMID.

No. 923,012.            Specification of Letters Patent.          Patented May 25, 1909.

Application filed March 2, 1908. Serial No. 418,801.

*To all whom it may concern:*

Be it known that we, CARL BOSCH and ALWIN MITTASCH, doctors of philosophy and chemists, subjects, respectively, of the King of Prussia and the King of Saxony, residing at Ludwigshafen-on-the-Rhine, Germany, have invented new and useful Improvements in the Production of Cyanids and Cyanamids, of which the following is a specification.

We have discovered that the titanium nitrids, under which term we include compounds containing only titanium and nitrogen, also the so-called titanium cyanonitrid, can be easily converted into cyanids, or cyanamids, of the alkali metals, or of the alkaline earth metals, by heating the selected titanium compound with carbon in the presence of an oxid, or a carbonate, or sulfate, or other salt, of an alkali metal, or of an alkaline earth metal. If desired, a mixture of two, or more, of such metallic oxids, or salts, can be employed. The reaction may, if desired, be carried out in the presence of a fluxing agent. The carbon may be employed, for instance, in the form of soot, or coal, or of a compound containing carbon (such for instance as pitch), and instead of these, or in addition thereto, gases capable of yielding carbon, such for instance as acetylene, may be passed into the heated mixture.

As a rule when a potassium, or a sodium, compound is employed, an alkali cyanid results, but barium hydroxid gives rise to a mixture of barium cyanid and barium cyanamid, and lime yields chiefly calcium cyanamid.

The process of the present invention is particularly valuable since the titanium is obtained in a form in which it can easily be reconverted into its nitrogen, or its carbon-nitrogen, compounds and thus a definite quantity of titanium can be used in the production of an indefinite quantity of cyanid, or cyanamid.

For the purposes of this invention, the titanium nitrids and titanium cyanonitrid are equivalents.

The following examples will serve to illustrate further the nature of our invention, which, however, is not confined to these examples, and the method of carrying it into practical effect. The parts are by weight.

Example 1: Melt together, for 30 minutes, at a red heat 10 parts of titanium cyanonitrid, 16 parts of anhydrous sodium carbonate, and 1 part of soot. When the melt is cold, the sodium cyanid contained therein can be treated in any convenient manner.

Example 2: Melt together, for 30 minutes, at a red heat, 12 parts of a mixture of molecular proportions of potassium carbonate and sodium carbonate, 1 part of soot, and 3 parts of titanium nitrid prepared by treating titanium tetrachlorid with ammonia. The reaction which takes place can be represented by the equation $$Ti_2N_2 + Na_2CO_3 + C = Ti_2O_3 + 2NaCN.$$

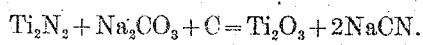

Example 3: Melt together, for 1 hour, at a yellow heat, a mixture of 30 parts of barium oxid and 6 parts of barium chlorid, 6 parts of titanium cyanonitrid, and 1 part of soot. The product contains barium cyanid and barium cyanamid.

Example 4: Heat together, for 15 minutes, at a yellow heat, 12 parts of quicklime, 24 parts of anhydrous calcium chlorid, 4 parts of titanium cyanonitrid, and 1 part of soot. The product contains calcium cyanamid and small quantities of calcium cyanid.

Now what we claim is:

1. The production of cyanids and cyanamids of the alkali metals and of the alkaline earth metals by heating a titanium nitrid with carbon in the presence of a hereinbefore defined metallic compound.

2. The production of sodium cyanid by heating a titanium nitrid with carbon in the presence of sodium salt.

3. The production of sodium cyanid by heating titanium nitrid with carbon in the presence of sodium carbonate.

In testimony whereof we have hereunto set our hands in the presence of two subscribing witnesses.

CARL BOSCH.
                ALWIN MITTASCH.

Witnesses:
   J. ALEC. LLOYD,
   JOS. H. LEUTE.